(12) United States Patent
Moon et al.

(10) Patent No.: US 8,370,961 B1
(45) Date of Patent: Feb. 5, 2013

(54) PROVIDING A TOPOGRAPHIC SIGNAL OF SAMPLE USING ATOMIC FORCE MICROSCOPE

(75) Inventors: Christopher Ryan Moon, Cupertino, CA (US); Daniel Y. Abramovitch, Palo Alto, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 13/249,890

(22) Filed: Sep. 30, 2011

(51) Int. Cl.
*G01Q 10/00* (2010.01)
(52) U.S. Cl. .......... 850/33; 850/1; 850/5; 850/6; 73/105
(58) Field of Classification Search .................... 850/33, 850/1, 5, 6; 73/105
See application file for complete search history.

(56) References Cited

U.S. PATENT DOCUMENTS

| | | | |
|---|---|---|---|
| 5,260,572 A * | 11/1993 | Marshall | 850/1 |
| 5,986,381 A | 11/1999 | Hoen et al. | |
| 7,219,538 B2 * | 5/2007 | Massie | 73/105 |
| 7,683,567 B2 | 3/2010 | Abramovitch | |
| 2011/0167524 A1 * | 7/2011 | Hu et al. | 850/1 |

OTHER PUBLICATIONS

U.S. Appl. No. 12/890,894, filed Sep. 27, 2010.
Sebastian, et al. "Robust Control Approach to Atomic Force Microscopy", Proceedings of the 42nd IEEE Conference on Decision and Control, Maui, Hawaii USA, Dec. 2003, p. 3443-3444.
Salapaka, et al. "A robust control based solution to the sample-profile estimation problem in fast atomic force microscopy", Int. J. Robust and Nonlinear Control 2005; 15:821-837.
Salapaka, et al. "Sample-profile estimate for fast atomic force microscopy", Applied Physics Letters 87, 053112 (2005).
International Application No. PCT/US11/26191 filed Feb. 25, 2011.

* cited by examiner

*Primary Examiner* — Kiet T Nguyen

(57) ABSTRACT

An atomic force microscope (AFM) apparatus for determining a topography of a sample surface is disclosed. The AFM apparatus comprises: a controller having a controller frequency response and being configured to provide a controller output signal. The controller comprises an integrator that provides an integrator output signal, and a filter block. The AFM apparatus also comprises a physical system having a physical system response and being configured to receive the controller output signal and to provide a probe height in response to the controller output signal. The physical system comprises an actuator configured to maintain a deflection of a probe tip relative to the sample surface. The deflection being is indicated by a deflection signal, and the filter block of the controller provides an inverse of the physical system response, such that the probe height is substantially equal to the integrator output signal.

20 Claims, 6 Drawing Sheets

PROVIDING A TOPOGRAPHIC SIGNAL OF SAMPLE USING ATOMIC FORCE MICROSCOPE

BACKGROUND

An atomic force microscope (AFM) is a comparatively high-resolution type of scanning probe microscope. With demonstrated resolution of fractions of a nanometer, AFMs promise resolution more than 1000 times greater than the optical diffraction limit.

Many known AFMs include a microscale cantilever with a sharp tip (probe tip) at its end that is used to scan the specimen surface. The cantilever is typically silicon or silicon nitride with a probe tip radius of curvature on the order of nanometers. When the probe tip is brought into contact with a sample surface, forces between the probe tip and the sample lead to a deflection of the cantilever. One or more of a variety of forces are measured via the deflection of the probe tip. These include mechanical forces and electrostatic and magnetostatic forces, to name only a few.

Typically, the deflection of the cantilevered probe tip is measured using a laser spot reflected from the top of the cantilever and onto an optical detector. Other methods that are used include optical interferometry and piezoresistive AFM cantilever sensing.

One component of AFM instruments is the actuator that maintains the angular deflection of the tip that scans the surface of the sample in contact-mode. Most AFM instruments use three orthonormal axes to image the sample. The first two axes (e.g., X and Y axes) are driven to raster-scan the surface area of the sample with respect to the probe tip with typical ranges of 100 µm in each direction. The third axis (e.g., Z axis) drives the probe tip orthogonally to the plane defined by the X and Y axes for tracking the topography of the surface.

Generally, the actuator for Z axis motion of the tip to maintain a near-constant deflection in contact-mode requires a comparatively smaller range of motion (e.g., approximately 1 µm (or less) to approximately 10 µm). However, as the requirement of scan speeds of AFMs increases, the actuator for Z axis motion must respond comparatively quickly to variations in the surface topography. In a contact-mode AFM, for example, a feedback loop is provided to maintain the tip of a cantilever in contact with a surface. The probe tip-sample interaction is regulated by the Z feedback loop, and the bandwidth of the Z feedback loop dictates how fast scanning can occur with the Z feedback loop remaining stable.

Conventionally, the signal that the Z feedback loop outputs to the Z actuator is imaged to create a topograph of a surface. However, this method of measuring topography is generally accurate only at low scan rates. Even if the probe tip tracks the sample surface perfectly at higher scan rates, the resulting image may still be distorted and full of ringing, thus leading to an unacceptable tradeoff between speed and image quality.

FIG. 6 is a simplified block diagram of a conventional AFM feedback loop, which includes controller 610, physical system 630 and sensor 650. The feedback loop regulates the distance between the probe tip and the sample surface as monitored by some relative height signal, which may be provided by cantilever deflection signal y (as shown in FIG. 6), or by resonant frequency, or by AC amplitude, for example, depending on the AFM mode. As the probe tip is scanned, the changing sample height h of the sample surface disturbs the deflection signal y as detected by sensor 650 from a deflection setpoint r, resulting in an error signal e. In response to the error signal e, the controller 610 adjusts the controller output signal u to change the probe height z of the probe tip, screening out the disturbance. However, the probe height z is not known and must be inferred from other signals in order to reconstruct the sample height h, which is the topography of the sample surface.

To address this issue, conventional AFMs scan the probe tip slowly, as mentioned above, to enable two approximations. The first approximation is that the probe tip tracks the sample surface perfectly, so that probe height z sample height h. The second approximation is that the desired physical system response $P_0$ of the physical system 630 (including the piezoelectric actuator) is constant, so that that the probe height z is proportional to the controller output signal u, or probe height $z \approx P_0 u$. Together, these two approximations lead to sample height $h \approx P_0 u$, which enables maps of the controller output signal u to be calibrated into topographs. However, at higher frequencies, both the first and second approximations break down. As the bandwidth of the closed AFM loop is approached, the sample surface becomes poorly tracked, effectively negating the first approximation. Also, the physical system 630 possesses electromechanical resonances that amplify the probe tip motion at some frequencies and null it at other frequencies. This frequency dependence of the piezoelectric response $P_0$ prohibits the probe height z from being directly inferred from controller output signal u, effectively negating the second approximation and otherwise introducing ringing artifacts into the topograph regardless of how well the sample is tracked.

Some conventional AFMs include a sensor that attempts to measure the actual extension of the piezoelectric actuator in the physical structure 630. However, such sensors typically have limited bandwidth and are otherwise oblivious to vibrations of the mechanical structures outside of the piezoelectric actuator that also affect probe-sample separation. When the sensor bandwidth is exceeded or the vibrational modes are excited, the sensor signal no longer reflects the probe height z, and thus image distortion and ringing artifacts still appear at moderate frequencies.

SUMMARY

In a representative embodiment, an atomic force microscope (AFM) apparatus for determining a topography of a sample surface is disclosed. The AFM apparatus comprises: a controller having a controller frequency response and being configured to provide a controller output signal. The controller comprises an integrator that provides an integrator output signal, and a filter block. The AFM apparatus also comprises a physical system having a physical system response and being configured to receive the controller output signal and to provide a probe height in response to the controller output signal. The physical system comprises an actuator configured to maintain a deflection of a probe tip relative to the sample surface. The deflection being is indicated by a deflection signal, and the filter block of the controller provides an inverse of the physical system response, such that the probe height is substantially equal to the integrator output signal.

In another representative embodiment, a method provides a topographic signal, indicating topography of a surface of a sample, using an AFM apparatus comprising a controller having a controller frequency response, a physical system having a physical system response and a feedback loop having a loop response corresponding to the product of the controller frequency response and the physical system response. The physical system includes an actuator configured to maintain a deflection of a probe tip relative to the sample surface. The method comprises: outputting a controller output signal from the controller to the physical system, the controller comprising an integrator for outputting an integrator output signal and at least one filter for providing an inverted physical system response for substantially canceling out the physical system response, such that a probe height output from the physical system, in response to the controller output signal, is substantially equal to the integrator output signal; and determining the topographic signal by subtracting the deflection of the probe tip from the integrator output signal.

In another representative embodiment, an AFM apparatus for scanning a surface of a sample using a probe tip of a cantilever to determine a topography of the sample surface is disclosed. The AFM apparatus comprises: a sensor configured to provide a deflection signal indicating deflection of the cantilever relative to the sample surface in response to the probe tip interacting with the sample surface; and a controller having a controller frequency response and comprising a first filter and at least one second filter following the first filter, the first filter acting on an error signal, which indicates a difference between the deflection signal from the sensor and a predetermined set point. The frequency response of the first filter being configured to substantially equal a desired loop response. The AFM apparatus comprises a physical system having a physical system response and comprising an actuator configured to maintain the deflection of the cantilever. The physical system is configured to receive a controller output signal and to provide a probe height in response to the controller output signal. The at least one second filter of the controller is configured so that a product of the controller frequency response and the physical system response yields the desired loop response, and an output of the first filter is an estimate of the probe height used to determine a topographic signal indicating the topography of the sample surface.

BRIEF DESCRIPTION OF THE DRAWINGS

The present teachings are best understood from the following detailed description when read with the accompanying drawing figures. The features are not necessarily drawn to scale. Wherever practical, like reference numerals refer to like features.

DETAILED DESCRIPTION

In the following detailed description, for purposes of explanation and not limitation, representative embodiments disclosing specific details are set forth in order to provide a thorough understanding of the present teachings. Descriptions of known devices, materials and manufacturing methods may be omitted so as to avoid obscuring the description of the example embodiments. Nonetheless, such devices, materials and methods that are within the purview of one of ordinary skill in the art may be used in accordance with the representative embodiments.

It is to be understood that certain terminology defined herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms "a", "an" and "the" include both singular and plural referents, unless the context clearly dictates otherwise. Thus, for example, "a device" includes one device and plural devices.

As used in the specification and appended claims, and in addition to their ordinary meanings, the terms "substantial" or "substantially" mean to within acceptable limits or degree.

As used in the specification and the appended claims and in addition to its ordinary meaning, the term "approximately" means to within an acceptable limit or amount to one having ordinary skill in the art.

As used herein, "physical system response" refers to a frequency response of a measured physical AFM signal when excited by a control loop output. For example, in a contact-mode AFM, the physical system response is the frequency response of the cantilever deflection signal to the controller output.

As used herein, "controller frequency response" refers to a designed frequency response of the controller that produces a voltage applied to an actuator, for example, in response to the deflection of the cantilever in a contact-mode AFM.

As used herein, "loop response" refers to the product of the physical system response and the controller frequency response.

According to various embodiments, the controller response of a control is designed as an integrator and a filter that provides an inverse physical system response. Given that the filter effectively cancels the effects of the physical system response (on the controller output), the integrator generally provides an integrator output signal that estimates the topography of a sample surface. Thus, the integrator output signal (e.g., adjusted for error introduced by deflection of the probe tip from the sample surface) becomes a topographic signal, indicating the topography of the sample surface.

Figure 1:
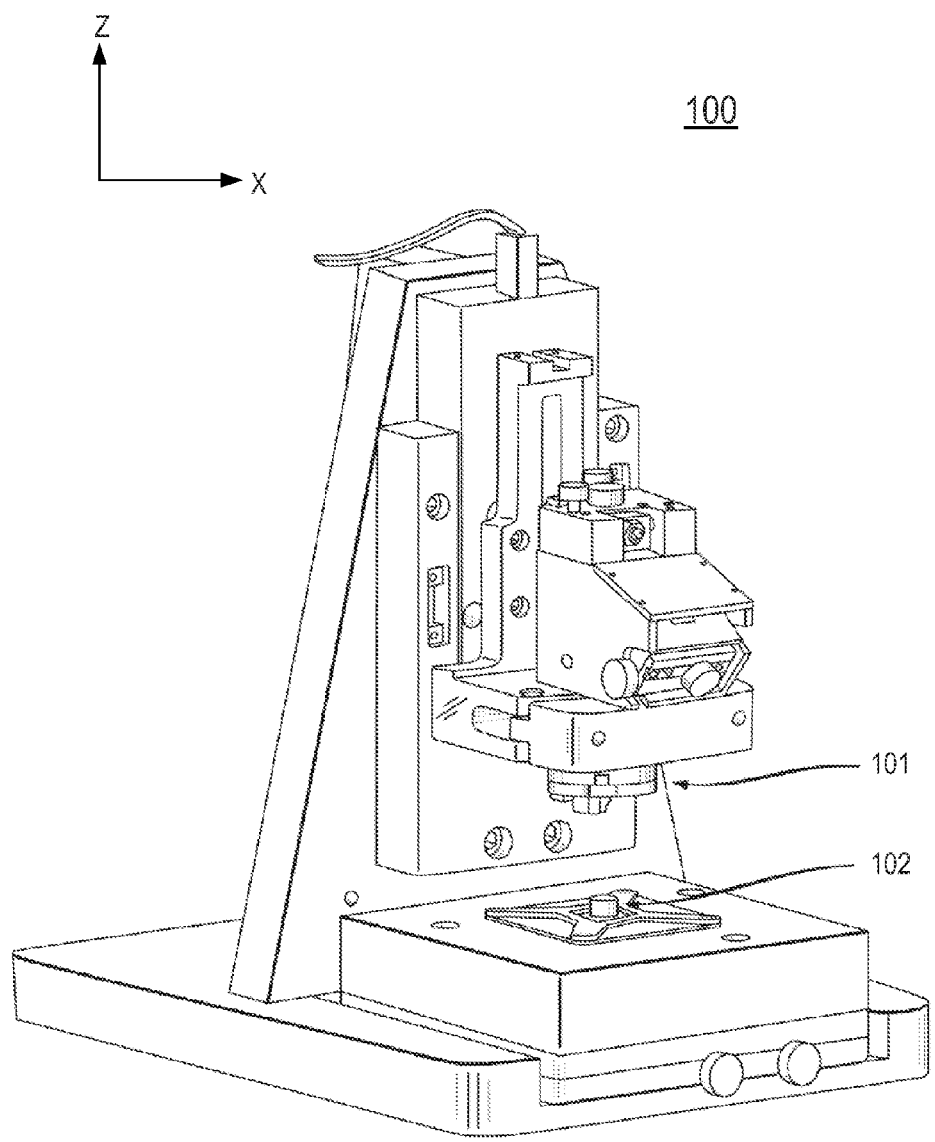
FIG. 1 is a perspective view of an apparatus for atomic force microscopy (AFM) in accordance with a representative embodiment.

FIG. 1 is a perspective view of an apparatus 100 for atomic force microscopy (hereinafter "AFM 100") in accordance with a representative embodiment. As will be readily appreciated by one of ordinary skill in the art, the present teachings are applicable to various types of AFMs, which may also be referred to as scanning probe microscopes (SPMs). The AFM 100 comprises many electrical and mechanical components, the discussion of which is outside the scope of the present teachings. The AFM 100 includes a probe assembly 101, certain components of which are described in connection with representative embodiments herein.

A sample 102 is maintained as shown for measurement and testing by the AFM 100. As described more fully herein, the sample 102 is generally moved in the X-Y plane of the coordinate system of FIG. 1 to raster-scan the surface of the sample by an actuator (not shown), with the surface topography being mapped by motion of the probe assembly 101 in the Z direction.

Figure 2:
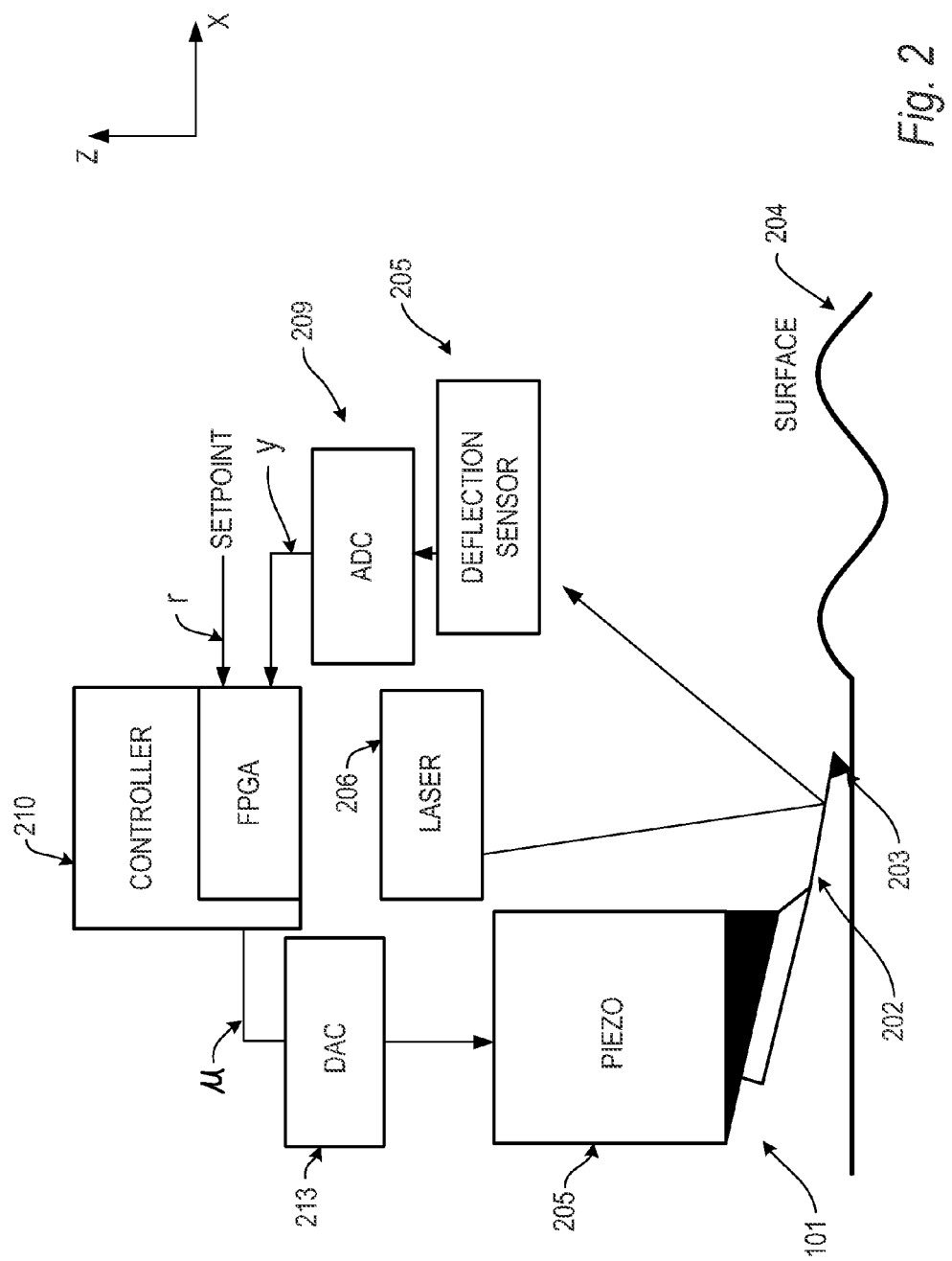
FIG. 2 is a simplified schematic block diagram of an AFM apparatus in accordance with a representative embodiment.

FIG. 2 is a simplified schematic block diagram of an AFM system 200 in accordance with a representative embodiment. The AFM system 200 comprises probe assembly 101 comprising a cantilever 202 with a probe tip 203 attached thereto, where the probe tip 203 is a separate part connected to the cantilever 202 or is formed integrally with the cantilever 202.

The probe tip 203 contacts a surface 204 of a sample (e.g., sample 102), and an actuator 205 is configured to raise and lower the probe tip 203 through operation of the cantilever 202 in response to contact movement with the surface 204. The probe tip 203 and cantilever 202 may be monolithically formed from a common substrate using known semiconductor processing techniques, and fastened to the actuator 205. Alternatively, the actuator 205, the cantilever 202 and the probe tip 203 may be monolithically formed from a common substrate. In representative embodiments, the probe tip 203 is configured to contact the surface 204 in order to make measurements of the surface topography. As such, AFM system 200 may be referred to as a contact-mode AFM.

The actuator 205 functions to provide motion of the probe tip 203 and cantilever 202 in the ±Z direction of the coordinate system shown in order to maintain a substantially constant force between the probe tip 203 and surface 204 of the sample. In a representative embodiment, the actuator 205 may be a piezoelectric actuator, for example, such as described in commonly owned U.S. patent application Ser. No. 12/890,894, filed on Sep. 27, 2010, entitled "Tandem Piezoelectric Actuator and Single Drive Circuit for Atomic Force Microscopy," to D. Schroeder, et al., the disclosure of which is hereby incorporated by reference. Alternatively, the actuator 205 may be an electrostatic "nanostepper" actuator, for example, such as described in commonly owned U.S. Pat. No. 5,986,381 to S. Hoen et al., dated Nov. 16, 1999, entitled "Electrostatic Actuator with Spatially Alternating Voltage Patterns," the disclosure of which is hereby incorporated by reference.

The AFM system 200 further comprises a laser 206 (or other suitable light source) disposed above the surface 204 of the sample. The laser 206 directs light which is reflected at the cantilever 202 and is incident on a deflection detector 207. The deflection detector 207 provides a deflection signal y to an analog-to-digital converter (ADC) 209, which provides a digitized signal to a controller 210. The deflection signal y is indicative of the movement of the probe tip 203 in the Z direction of the coordinate system shown in FIG. 2. In response to the deflection signal y, the controller 210 provides an output signal u to the actuator 205 via digital-to-analog converter (DAC) 213 to raise and lower the cantilever 202 and probe tip 203 to maintain a constant deflection equal to a deflection setpoint r, leading to a constant force between the probe tip 203 and the surface 204 in contact-mode. Among other functions, the controller 210 may be configured to account for resonance conditions that can occur when the cantilever 202 is deflected off the surface 204 ("off-surface resonance conditions"), as described in commonly owned International Application PCT/US11/26191, filed on Feb. 25, 2011, entitled "Atomic Force Microscopy Controller and Method" to C. Moon, the disclosure of which is hereby incorporated by reference.

The controller 210 may be implemented in whole or in part by a processing device, such as a processor or central processing unit (CPU), application specific integrated circuits (ASICs), field-programmable gate arrays (FPGAs), or combinations thereof, using software, firmware, hard-wired logic circuits, or combinations thereof. Details of certain aspects of the functions of the controller 210 are provided below in connection with the representative embodiments. In an embodiment, the controller 210 is implemented on a real-time operating system (OS) used in the AFM system 200 or as a standalone device. When using a processor or CPU, a memory (not shown) is included for storing executable software/firmware and/or executable code that controls the signal from the controller 210 to the actuator 205. The memory may be any number, type and combination of nonvolatile read only memory (ROM) and volatile random access memory (RAM), and may store various types of information, such as computer programs and software algorithms executable by the processor or CPU. The memory may include any number, type and combination of tangible computer readable storage media, such as a disk drive, an electrically programmable read-only memory (EPROM), an electrically erasable and programmable read only memory (EEPROM), a CD, a DVD, a universal serial bus (USB) drive, and the like.

For example, the controller 210 may include an FPGA onto which hardware description language (such as Verilog or VHDL) code has been compiled and uploaded. The deflection signal y from the deflection detector 207 is digitized by ADC 209. Based on the deflection signal y, the FPGA creates controller output signal u that emerges from the DAC 213, is amplified, and then provided to the actuator 205. The controller 210 illustratively includes a proportional-integral-differential (PID) filter block and a series of digital biquadratic filters, for example, known to one of ordinary skill in the art. The PID filter block and the digital biquadratic filters of the controller 210 have coefficients useful in establishing the filter characteristics, discussed below. The coefficients can be dynamically reconfigured to change the filter characteristics, such as by a remote computer (e.g. a computer hosting a graphical user interface for the AFM system 200 and communicating via a communication protocol, such as ethernet). The frequency response of the controller 210 (controller frequency response) is a function of the filter coefficients, and methods for calculating theoretical frequency responses for digital filters are well-known. Illustratively, the frequency responses of the controller 210 can be calculated using known programming software (e.g., Matlab). For example, a notch filter for use in mitigating off-surface resonances of the cantilever 202, as described by International Application PCT/US11/26191 to C. Moon, which is hereby incorporated by reference, can be specified by a center frequency, a depth, and a width (quality (Q) or damping factor).

Figure 3:
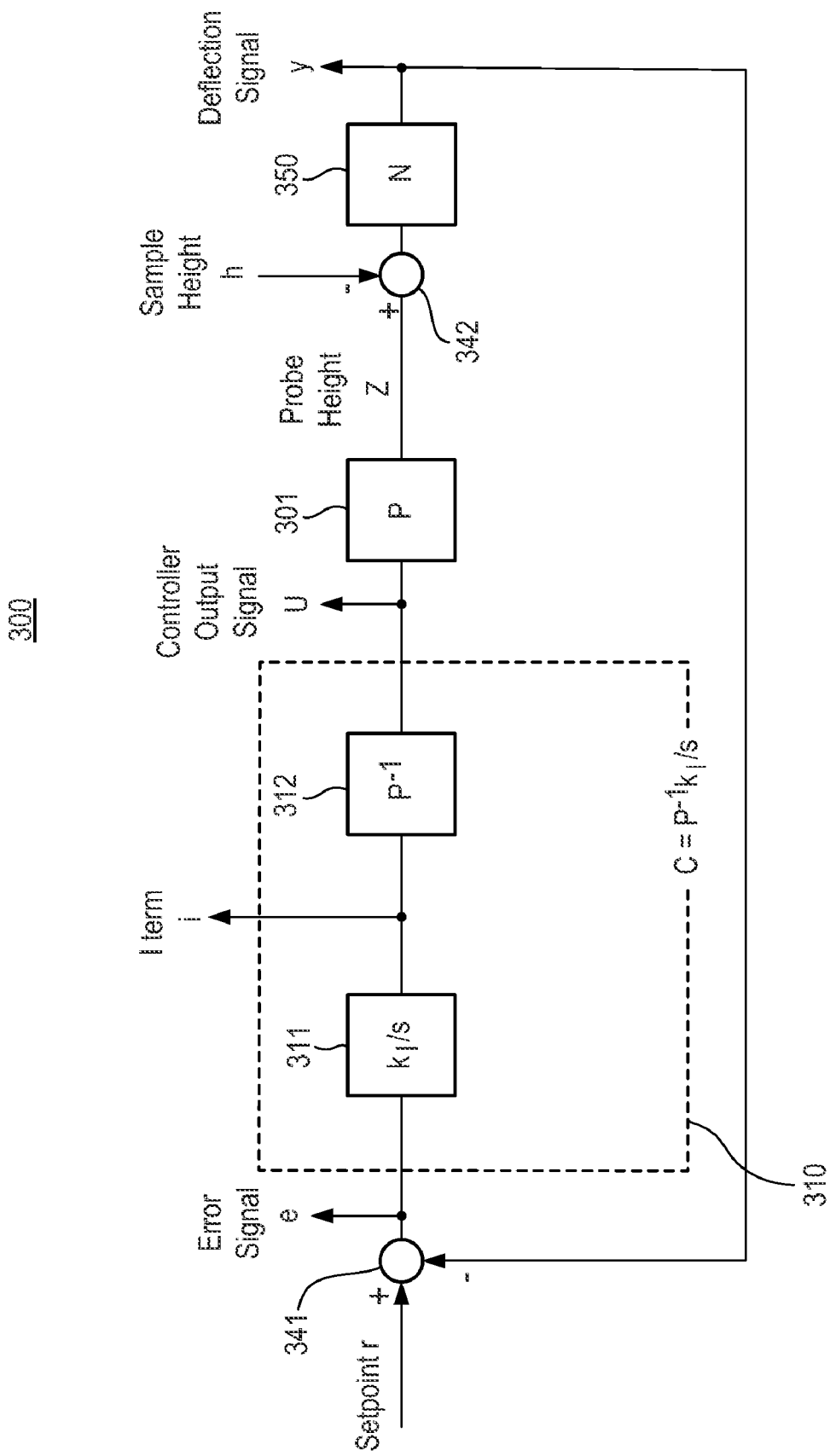
FIG. 3 is a simplified schematic block diagram of a feedback loop in an AFM apparatus in accordance with a representative embodiment.

FIG. 3 is a simplified schematic block diagram of a feedback loop 300 of an AFM apparatus, such as AFM system 200, in accordance with a representative embodiment, for providing high bandwidth topography. The feedback loop 300 includes controller 310, physical system 301 and sensor 350 (which may be considered part of the physical system 301 for purposes of determining physical system response P). The physical system 301 illustratively comprises the controller 210, the actuator 205, the cantilever 202 and the probe tip 203, and the sensor 350 may include the deflection detector 207, discussed above with reference to FIG. 2, for example. As stated above, the loop response L of the feedback loop 300 is the product of the controller frequency response C of the controller 310 and the physical system response P of the physical system 301, or L=CP. Loop shaping typically involves selecting a controller frequency response C that best makes the loop response L have a desired loop response $L_0$, such that the controller frequency response C is the product of the desired loop response $L_0$ and the inverse of the physical system response P, or $C \approx L_0 P^{-1}$.

Generally, the controller 310 adjusts the voltage on the actuator 205 in response to the changing height of the surface of a sample (e.g., the surface 204 of sample 102) beneath the probe tip 203, maintaining the deflection signal y at deflection setpoint r in contact-mode, where the deflection signal y is the deflection of the cantilever 202 in the physical system 301. An error signal e is calculated in the time domain at subtractor 341 as the difference between the set point r and the deflection y, or e=r−y. The error signal e is input to the controller 310, which provides controller output u to the physical system 301 in accordance with the controller frequency response C.

Inside the physical system 301, the controller output u corresponds to a voltage applied to the actuator 205, which controls the probe height z of the probe tip 203 along the Z axis. As indicated in at point 342 of FIG. 3, the deflection signal y indicating the deflection of the cantilever 202 is the physical result of the difference between the sample height h of the surface 204 and the probe height z provided by the actuator 205. The sample height h corresponds to the topography of the surface 204, and thus a signal indicating the sample height h may be referred to as the topographic signal.

In the depicted embodiment, the controller 310 includes an integrator 311 and a filter block 312. The integrator 311 outputs an integrator output signal i and the filter block 312 provides an inversion of the physical system response P (that is, inverted physical system response $P^{-1}$). Accordingly, the probe height z, output by the physical system 301 in response to the controller output signal u, is substantially equal to the integrator output signal i, since the inverted physical system response $P^{-1}$ effectively cancels out the physical system response P. Thus, the sample height h, which is effectively a topographic signal indicating the topography of the surface 204, may be determined as the difference between the integrator output signal i and the deflection signal y, as discussed in more detail below. The frequency response of the integrator 311 may be indicated by $k_I/s$, where $k_I$ is the integral gain (integrator bandwidth) and s is the complex frequency. Also, the inverted physical system response $P^{-1}$ is effective over a particular frequency range. Generally speaking, the effects of the physical system response P are inverted by the filter block 312 in a way that is limited in bandwidth and does not create internal oscillatory signals which cannot be corrected from the input-output behavior. Since most physical systems 301 are low pass in nature, a perfect inverted physical system response $P^{-1}$ would be high pass and amplify high frequency noise. Therefore, the physical system response P is canceled within a desired frequency range and to a desired level of accuracy.

More particularly, from FIG. 3 (and FIG. 1), it is apparent that the sample height h is the difference between the probe height z and the deflection signal y, when N is equal to 1, as shown in Equation (1):

$$h=z-y \quad (1)$$

As mentioned above, the probe height z is the product of the controller output signal u and the physical system response P, as shown in Equation (2):

$$h=Pu-y \quad (2)$$

Also, the deflection signal y is the difference between the set point r and the error signal e, as shown in Equation (3):

$$h=Pu+e-r \quad (3)$$

If the deflection setpoint r is assumed to be constant, then the deflection setpoint r may be arbitrarily set to 0. Also, the controller output signal u may be indicated by the product of the error signal e and the controller response frequency C, as shown in Equation (4):

$$h=(1+PC)e \quad (4)$$

Equation (4) has been used to provide filters for topographic signals (i.e., sample height h) having moderately larger bandwidths than otherwise provided by the controller output signal u. Theory for such AFM systems are described, for example, in Salapaka et al., *A Robust Control Based Solution to the Sample-Profile Estimation Problem in Fast Atomic Force Microscopy*, INTERNATIONAL J. OF ROBUST AND NONLINEAR CONTROL (2005); Salapaka et al., *Sample-Profile Estimate for Fast Atomic Force Microscopy*, APPLIED PHYSICS LETTERS (2005); and U.S. Pat. No. 7,683,567 to Abramovitch (Mar. 23, 2010). For example, Salapaka et al. constructed a filter having filter response F to produce a topographic signal from the error signal e, choosing F=(1+PC). Such an approach is difficult to implement, as a practical matter, because it relies on analytical models of the physical response P and the controller frequency response C, which are highly error-prone for dynamic systems, like AFMs. Also, a filter modeled on such an approach is complex and high-order, which makes numerical precision a challenge and consumes resources. Equation (2) above reduces filter order somewhat, but is still reliant on the analytical models of the physical response P and the controller frequency response C.

To avoid these issues, according to various embodiments, Equation (2) is rewritten to substitute the product of the controller frequency response C and the error signal e for the controller output signal u, as shown in Equation (5):

$$h=PCe-y \quad (5)$$

The controller 310 may be designed to explicitly make the term PC match a desired loop response $L_0$, for example, by choosing $C \approx P^{-1}L_0$. This loop shaping compensates for the resonances in the physical response P that would otherwise limit the feedback bandwidth by providing the inverse physical system response P. Then, recognizing that the controller 310 is not monolithic, the controller frequency response C may be structured to contain an internal signal equaling the product of the desired loop response $L_0$ and the error signal e. The sample height h, and thus the topographic signal indicating the topography of the surface 204, may be accurately approximated by tapping the internal signal of the controller 310 to provide Equation (6), which is trivial to calculate:

$$h=L_0 e-y \quad (6)$$

For example, the desired loop response $L_0$ may be designed to be an integrator, as mentioned above, which is the simplest possible loop shape. Accordingly, the controller frequency response C may be implemented as the integrator 311, which AFM systems include (to achieve zero steady-state error), and the filter block 312, which inverts the physical response P. If the integrator 311 and the filter block 312 are implemented in the correct order, as indicated by FIG. 3, the integrator output signal i substantially equals the previously unknown probe height z output by the physical system 301. Therefore, the topography signal (sample height h) is simply provided by Equation (7):

$$h=i-y \quad (7)$$

A simple, high-bandwidth topography signal (sample height h) can therefore be constructed for the controller frequency response C and physical response P. That is, construction of the topographic signal is immensely simplified without sacrificing feedback performance.

Figure 4:
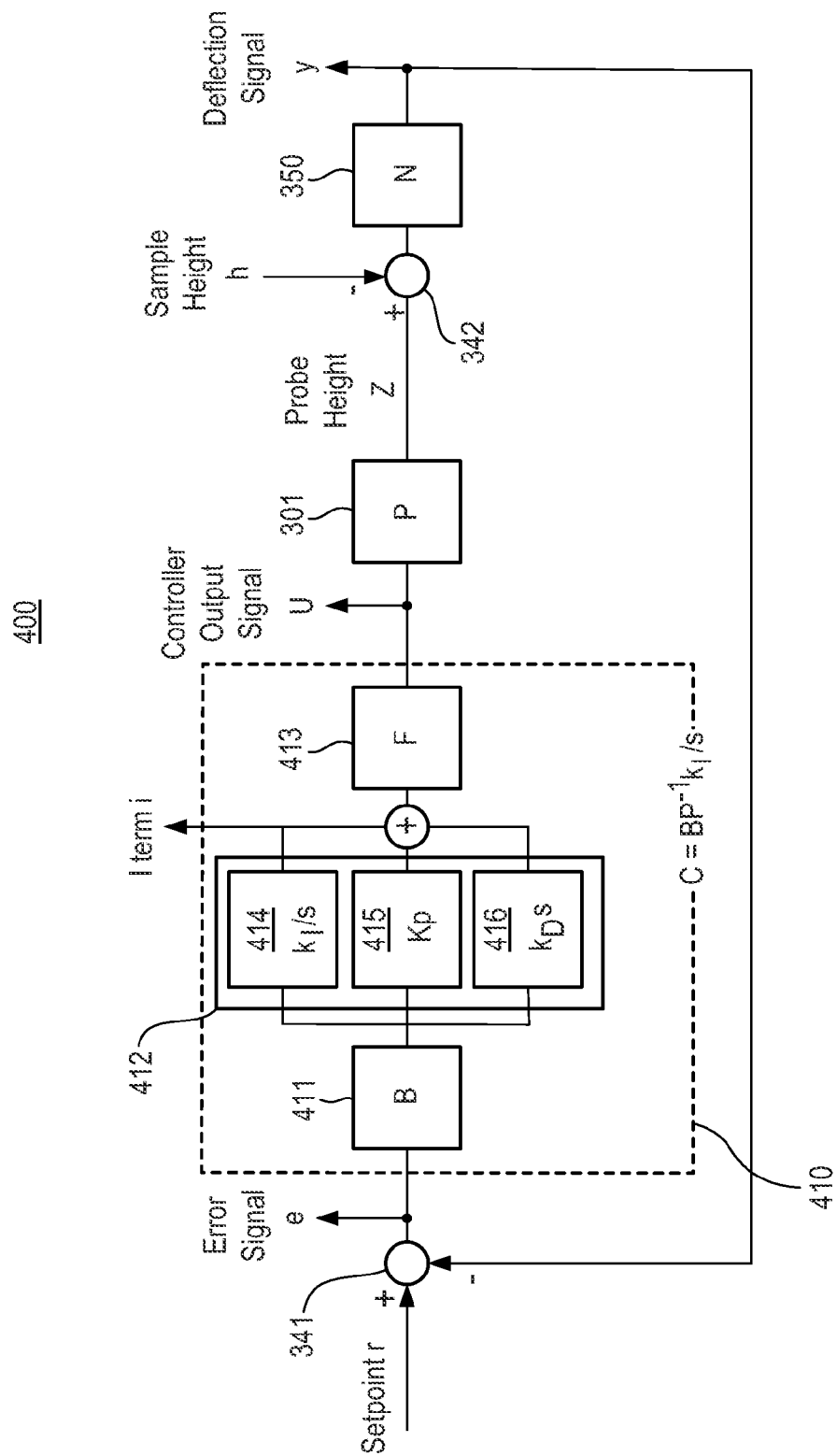
FIG. 4 is a simplified schematic block diagram of a feedback loop in an AFM apparatus in accordance with a representative embodiment.

FIG. 4 is a simplified schematic block diagram of a feedback loop 400 of an AFM apparatus, such as AFM system 200, in accordance with another representative embodiment, for providing high bandwidth topography. The feedback loop 400 includes controller 410, physical system 301 and sensor 350, where the physical system 301 includes, the controller 210, the actuator 205, the cantilever 202 and the probe tip 203, discussed above with reference to FIG. 2, for example. The feedback loop 400 is similar to the feedback loop 300 of FIG. 3, except that the controller 410 includes pre-filter block 411, PID filter block 412 and post-filter block 413, which provide effectively the same functionality as the integrator 311 and the filter block 312, discussed above. Incorporation of the PID filter block 412 for performing the various embodiments may be desirable for users who are accustomed to using PID controllers. Each of the pre-filter block 411 and the post-filter block 413 may include one or more filters, such as digital biquadratic filters, for example, although other types of filters may be incorporated without departing from the scope of the present teachings.

Referring to FIG. 4, the loop response L of the feedback loop 400 is the product of the controller frequency response C of the controller 410 and the physical system response P of the physical system 301, or L=CP. Again, loop shaping typically involves selecting a controller frequency response C that best makes the loop response L have a desired loop response $L_0$, such that the controller frequency response C is the product of the desired loop response $L_0$ and the inverse of the physical system response P, or $C \approx L_0 P^{-1}$.

The PID filter block 412 includes integral block 414, proportional block 415 and differential block 416. The integral block 414 may be indicated by Ws (discussed above); the proportional block 415 may be indicated by $k_P$, where $k_P$ is the proportional gain; and the differential block 416 may be indicated by $k_D s$ where $k_D$ is the differential gain and s is the complex frequency, for example. In various embodiments, coefficients of the PID filter block 412 and the post-filter block 413 are optimized to shape PC like a bare integrator. Thus, the PID filter block 412 and the post-filter block 413 work together to create an integrator loop shape, resulting in the dynamics of the physical response P being inverted, such that the probe height z controlled by the physical system 301 is equal to the integrator output signal i provided by the integral block 414. The topography signal (sample height h) is equal to the difference between the integrator output signal i and the deflection signal y (h=i−y), as discussed above. That is, the controller response C of the controller 410 becomes the functional equivalent of the controller response C of the controller 310, discussed above, i.e., an integrator followed by filters that invert the physical system response P. The pre-filter block 411 may be configured to shape or modify the integrator further, enabling any desired loop shape of the feedback loop 400. As such, the pre-filter block 411 may be used to create any arbitrary loop shape. Since the pre-filter block 411 is inserted before the PID filter block 412, it modifies both the integrator output signal i and the loop shape $L_0$, so that the relationship $i=L_0 e$ is maintained and h=i−y (Equation (7)) remains valid.

Accordingly, the AFM apparatus with the feedback loop 400 may have an arbitrary loop shape, enabling maximum feedback bandwidth, and still acquire an accurate topographic signal by simply summing two signals (the integrator output signal i and the deflection signal y); no extra complex inverse filters are required. Indeed, if the usual approximation that the surface 204 of the sample is being properly tracked by the probe tip 203 holds, the algorithm becomes even simpler, since the deflection signal y would remain approximately equal to the deflection setpoint r. Thus, so as long as the deflection setpoint r is constant, the topographic signal (surface height h) would be approximately equal to just the integrator output signal i, and no additional calculations whatsoever are required to obtain the full topography. Additionally, in various embodiments, the topographic signal may pass through a low-pass filter (not shown), since the deflection signal y contains sensor noise and no actual surface information at high enough frequencies.

Notably, the effect of the sensor 350, which typically has large bandwidths compared to the feedback bandwidth, need not necessarily be considered. However, in various embodiments, the sensor 350 may be included per Equation (5), such that $h=PCe-N^{-1}y$, which may be written as $h=N^{-1}(L-y)$. The loop response L is now L=NPC. If the loop response L were shaped like an integrator, then $h=N^{-1}(i-y)$. Alternatively, the loop response L may be shaped like N times an integrator, leaving N uncompensated, in which case $h=i-N^{-1}y$. Naturally, this requires an estimate of N, and its inverse should be rolled off at some high frequency where the signal-to-noise ratio becomes small. However, as long as the surface 204 is properly tracked, the deflection signal y term is negligible and the relationship of sample height h≈integrator output signal i is recovered.

Many conventional approaches to controller design do not have a target desired loop response $L_0$. These approaches are then forced to construct large filters for both feedback and imaging. In contrast, the embodiments and methods disclosed herein enable an accurate image that is essentially free.

Figure 5:
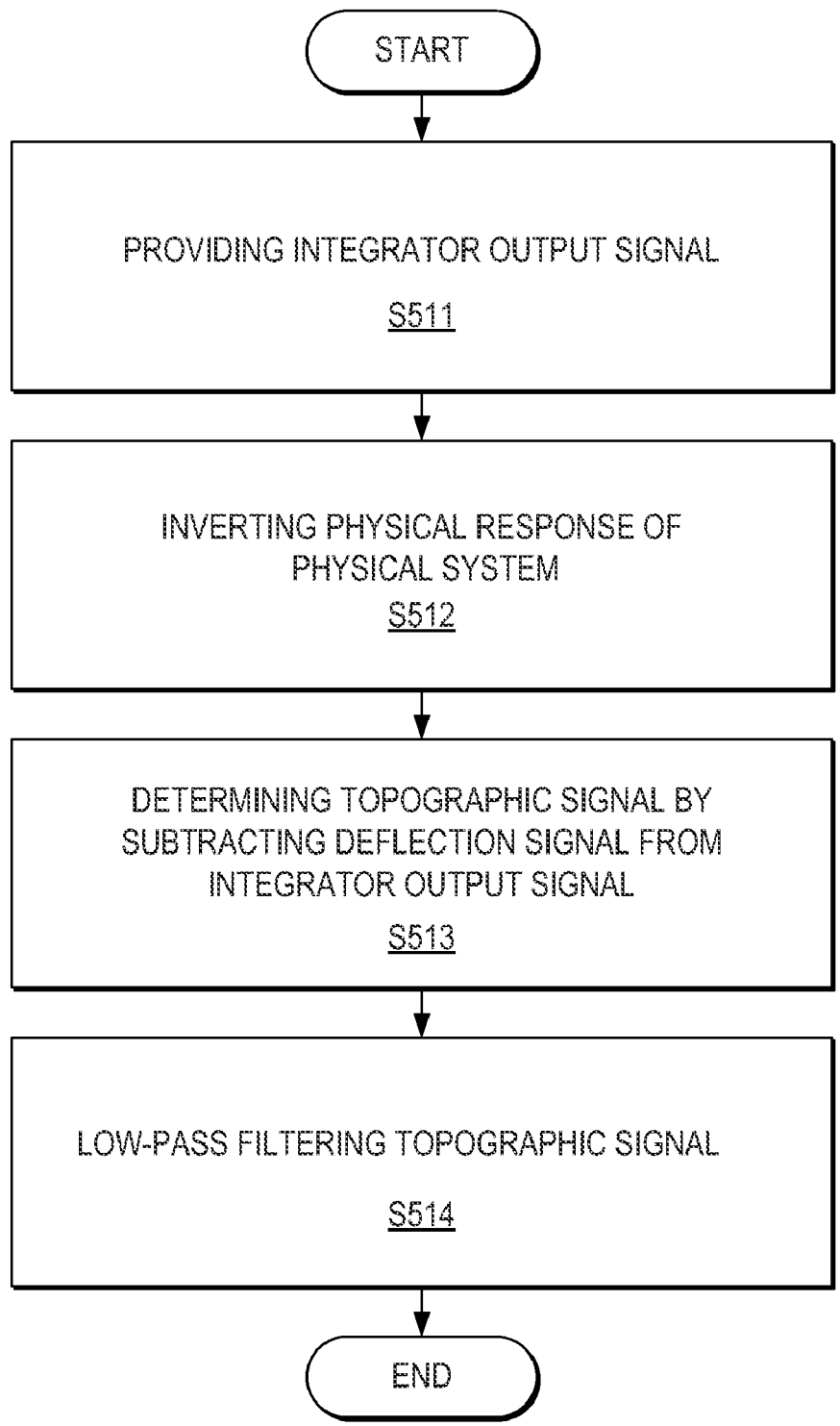
FIG. 5 is a flow diagram showing operation of a feedback loop in an AFM apparatus in accordance with a representative embodiment.
Figure 6:
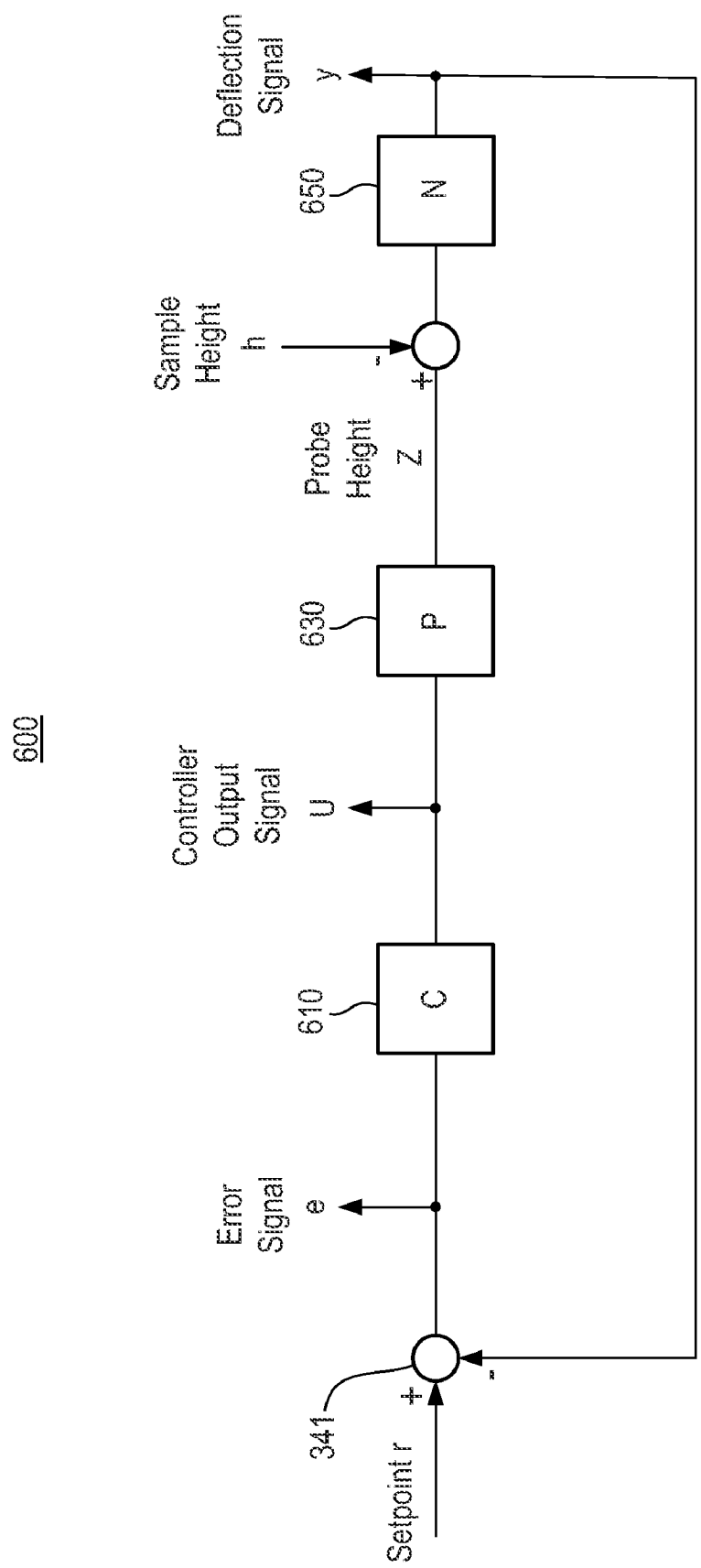
FIG. 6 is a simplified schematic block diagram of a feedback loop in a conventional AFM apparatus.

FIG. 5 is a flow diagram showing a method of providing a topographic signal, indicating topography of a surface of a sample, using an AFM apparatus, such as AFM system 200, in accordance with a representative embodiment. As discussed above with reference to FIGS. 2-4, the AFM apparatus includes a controller (e.g., controller 310, 410) having a controller frequency response C, a physical system (e.g., physical system 301) having a physical system response P and a feedback loop (e.g., feedback loop 300, 400) having a loop response L corresponding to the product of the controller frequency response C and the physical system response P. Also as discussed above, the physical system includes an actuator (e.g., actuator 205) configured to maintain a deflection signal y of a probe tip (e.g., probe tip 203) relative to the surface (e.g., surface 204) of the sample (e.g., sample 102) via the sensor 350.

Referring to FIG. 5, the controller provides an integrator output signal i in block S511 and provides an inverted physical response $P^{-1}$ through one or more filters following the integrator in block S512, such that the probe height z output by the physical system is equal to the integrator output signal i. For example, the loop response L of the AFM system 200 may be shaped to be an integrator, thus providing the inverted physical response $P^{-1}$ and leaving the integrator output signal i following the physical system. For example, in the feedback loop 400 of FIG. 4, where the controller 410 includes the PID filter block 412, the filter response F of the post-filter block 413 and the P and D coefficients $k_P$ and $k_D$ of the PID filter block 412 are tuned so that the combination of the post-filter block 413 and the PID filter block 412, when multiplied by the physical system response P, yields an integrator loop shape. In other words, the filter response F and P and D coefficients are designed so that F* (PID response)*P=($k_I/s$). Blocks S511 and S512 may be executed by an integrator and filters in the controller, for example, where a controller output signal u is provided to the physical system, which in turn outputs a signal indicating the probe tip height z.

In block S513, the topographic signal is determined by subtracting the deflection signal y indicating the deflection of the probe tip 203 from the integrator output signal i. As discussed above, when the probe tip 203 is assumed to be properly tracking the surface 204, the deflection signal y is approximately equal to the deflection setpoint r. Thus, the topographic signal may be determined to be approximately equal to the integrator output signal i when the deflection setpoint r is constant. In addition, the integrator and filters may be implemented using PID block (e.g., PID filter block 412) and a post-filter block (e.g., post-filter block 413), such that shaping the loop response L includes optimizing coefficients of the PID filter block 412 and the post-filter block 413 to provide an integrator loop shape. A pre-filter block (e.g., pre-filter block 411) may be included to modify the integrator output signal i to create a loop shape different from an integrator loop shape, for example. The topographic signal may be low-pass filtered in block S514.

As mentioned above, error signal e may be factored into the determination of the topography. Generally, when considering the error signal e, the goal is to create a topographic signal (sample height h) that is the sum of the probe height z (unknown) and the error signal e. In this case, the probe height z may be provided by Equation (8), as follows:

$$z=PCe=Le \qquad (8)$$

Thus, as discussed above, the controller can be constructed such that an internal signal will naturally equal the product of the loop response L and the error signal e. Thus, in an embodiment, any loop shape of the loop response L will work (including an integrator loop shape, as discussed above). As a result, imaging considerations (i.e., measuring the topography of the sample) are effectively separated from control considerations (designing a feedback controller to regulate the tip-sample interaction). Accordingly, the controller does not necessarily need to contain an integrator. For instance, to provide higher speeds, a proportional controller may that also inverts the physical system response P may be used. For example, the controller frequency response C would be $k_P*P^{-1}$, and thus the output of the gain block $k_P$ (proportional term) would be the estimate of z. In any case, the filter(s) that provide the inverse of the physical system response P are placed after or in parallel with the filter(s) that possess the desired loop shape L, otherwise the controller will not contain a useful signal that estimates the probe height z.

Accordingly, the controller provides a first filter that acts on the error signal e with a frequency response F equal to a desired loop response L. The controller provides one or more second filters in addition to the first filter, such that the product of the resulting controller frequency response C and the physical system response P yields the desired loop response L. The output of the first filter may then be used as the estimate of the probe height z. The deflection signal y may be subtracted from the estimate of the probe height z, and the resulting topographic signal may be low-pass filtered, as discussed above.

In various embodiments, the various blocks depicted FIGS. 2-5 may be incorporated within one or more processing modules of a device, such as the controller 310, 410, without departing from the scope of the present teachings. The modules may be implemented as any combination of hardware, software, hard-wired logic circuits and/or firmware configured to perform the designated operations.

It is understood that the various embodiments may apply to various AFM modes, such as contact mode, deflection mode, AC mode or frequency modulation (FM) mode, as well as to any type of feedback loop included in these modes, without departing from the scope of the present teachings.

In view of this disclosure it is noted that the various apparatuses and methods for controlling an AFM can be implemented in variant structures, using variant components and variant methods in keeping with the present teachings. Further, the various components, structures and parameters are included by way of illustration and example only and not in any limiting sense. In view of this disclosure, those skilled in the art can implement the present teachings in determining their own applications and needed components, materials, structures and equipment to implement these applications, while remaining within the scope of the appended claims.

The invention claimed is:

1. An atomic force microscope (AFM) apparatus for determining a topography of a sample surface, the AFM apparatus comprising:
   a controller having a controller frequency response and being configured to provide a controller output signal, the controller comprising an integrator that provides an integrator output signal, and a filter block; and
   a physical system having a physical system response and being configured to receive the controller output signal and to provide a probe height in response to the controller output signal, the physical system comprising an actuator configured to maintain a deflection of a probe tip relative to the sample surface, the deflection being indicated by a deflection signal, the filter block of the controller providing an inverse of the physical system response, such that the probe height is substantially equal to the integrator output signal,
   wherein a topographic signal indicating the topography of the sample surface is the difference between the integrator output signal and the deflection signal.

2. The AFM apparatus of claim 1, wherein the integrator and the filter block are implemented by a proportional-integral-differential (PID) block, and a post-filter connected to an output of the PID block, wherein coefficients of the PID block and the post-filter are optimized to shape a loop response of a feedback loop in the AFM apparatus as a bare integrator.

3. The AFM apparatus of claim 2, wherein the controller further comprises:
   a pre-filter connected to an input of the PID block and configured to modify the integrator output signal to create a predetermined loop shape different from an integrator loop shape.

4. The AFM apparatus of claim 3, wherein the predetermined shape enables maximum feedback bandwidth of a feedback loop having the loop response.

5. The AFM apparatus of claim 1, wherein when the deflection of the probe tip is approximately equal to a predetermined deflection setpoint, the topographic signal is approximately equal to the integrator output signal when the deflection setpoint is constant.

6. The AFM apparatus of claim 5, further comprising:
   a low-pass filter configured to filter the topographic signal.

7. The AFM apparatus of claim 5, wherein the physical system response comprises a frequency response corresponding to the deflection of the probe tip.

8. A method of providing a topographic signal, indicating topography of a surface of a sample, using an atomic force microscope (AFM) apparatus comprising a controller having a controller frequency response, a physical system having a physical system response and a feedback loop having a loop response corresponding to the product of the controller frequency response and the physical system response, the physical system comprising an actuator configured to maintain a deflection of a probe tip relative to the sample surface, the method comprising:
   outputting a controller output signal from the controller to the physical system, the controller comprising an integrator for outputting an integrator output signal and at least one filter for providing an inverted physical system response for substantially canceling out the physical system response, such that a probe height output from the physical system, in response to the controller output signal, is substantially equal to the integrator output signal; and determining the topographic signal by subtracting the deflection of the probe tip from the integrator output signal.

9. The method of claim 8, wherein the controller frequency response provides an integrator loop shape of the loop response.

10. The method of claim 8, wherein when the probe tip is assumed to be properly tracking the sample surface, the deflection signal is approximately equal to a predetermined deflection setpoint, and the topographic signal is determined to be approximately equal to the integrator output signal.

11. The method of claim 8, wherein the controller comprises a proportional-integral-derivative (PID) block and a post-filter block, the method further comprising:
optimizing coefficients of the PID block and the post-filter block to provide an integrator loop shape.

12. The method of claim 11, wherein the controller further comprises a pre-filter block, the method further comprising:
modifying the integrator output signal to create a predetermined loop shape different from the integrator loop shape.

13. The method of claim 12, wherein the predetermined shape enables maximum feedback bandwidth of the feedback loop.

14. The method of claim 8, further comprising:
approximating the deflection of the probe tip relative to the sample surface to be substantially equal to a predetermined deflection setpoint; and
approximating the topographic signal to be substantially equal to the integrator output signal when the deflection setpoint is constant.

15. The method of claim 14, further comprising:
low pass filtering the topographic signal.

16. An atomic force microscope (AFM) apparatus for scanning a surface of a sample using a probe tip of a cantilever to determine a topography of the sample surface, the AFM apparatus comprising:

a sensor configured to provide a deflection signal indicating deflection of the cantilever relative to the sample surface in response to the probe tip interacting with the sample surface;

a controller having a controller frequency response and comprising a first filter and at least one second filter following the first filter, the first filter acting on an error signal, which indicates a difference between the deflection signal from the sensor and a predetermined set point, a frequency response of the first filter being configured to substantially equal a desired loop response; and a physical system having a physical system response and comprising an actuator configured to maintain the deflection of the cantilever, the physical system being configured to receive a controller output signal and to provide a probe height in response to the controller output signal, wherein the at least one second filter of the controller is configured so that a product of the controller frequency response and the physical system response yields the desired loop response, and an output of the first filter is an estimate of the probe height used to determine a topographic signal indicating the topography of the sample surface.

17. The apparatus of claim 16, wherein the topographic signal is the difference between the output of the first filter and the deflection signal.

18. The apparatus of claim 16, further comprising:
a low-pass filter for filtering the topographic signal.

19. The apparatus of claim 16, wherein the first filter and the at least one second filter are included in a proportional-integral-derivative (PID) block and a post-filter connected to an output of the PID block.

20. The apparatus of claim 19, wherein the desired loop response is an integrator loop shape.

* * * * *